United States Patent
Gaikwad et al.

(10) Patent No.: US 9,679,316 B2
(45) Date of Patent: Jun. 13, 2017

(54) SELECTING DIVERSE PRODUCT TITLES TO DISPLAY ON A WEBSITE

(75) Inventors: Sandip Namdeo Gaikwad, Sunnyvale, CA (US); Sanjay Pundlkrao Ghatare, San Jose, CA (US); Joseph Anthony Beynon, Mountain View, CA (US)

(73) Assignee: PAYPAL, INC., San Jose, CA (US)

( * ) Notice: Subject to any disclaimer, the term of this patent is extended or adjusted under 35 U.S.C. 154(b) by 461 days.

(21) Appl. No.: 13/490,035

(22) Filed: Jun. 6, 2012

(65) Prior Publication Data

US 2012/0310787 A1  Dec. 6, 2012

Related U.S. Application Data

(60) Provisional application No. 61/493,877, filed on Jun. 6, 2011.

(51) Int. Cl.
*G06Q 30/06* (2012.01)
*G06Q 30/02* (2012.01)

(52) U.S. Cl.
CPC ..... *G06Q 30/0282* (2013.01); *G06Q 30/0601* (2013.01)

(58) Field of Classification Search
CPC ........... G06Q 30/0603; G06Q 30/0282; G06Q 30/0631
USPC ..................... 705/26.1, 27.1, 26.7
See application file for complete search history.

(56) References Cited

U.S. PATENT DOCUMENTS

| | | | | |
|---|---|---|---|---|
| 7,814,089 B1* | 10/2010 | Skrenta | ............. | G06F 17/30864 707/709 |
| 2008/0120292 A1* | 5/2008 | Sundaresan | ......... | G06F 17/3071 |
| 2010/0064254 A1* | 3/2010 | Atsmon | ............ | G06Q 30/0603 715/810 |
| 2010/0082410 A1* | 4/2010 | Baudin | ................. | G06Q 30/06 705/7.29 |
| 2010/0235351 A1* | 9/2010 | Iwasa | ................ | G06F 17/30038 707/723 |
| 2012/0078721 A1* | 3/2012 | Dakka | ................ | G06Q 30/0241 705/14.55 |

* cited by examiner

*Primary Examiner* — Mila Airapetian
(74) *Attorney, Agent, or Firm* — Maschoff Brennan (57) ABSTRACT

A system and method for selecting diverse product titles to display on a website are disclosed. In some example embodiments, the methods and systems described herein identify available products to be displayed, cluster the identified products based on their similarity to one another, select one or more products from each of the clusters, and display information, such as a title, associated with the randomly selected products.

17 Claims, 7 Drawing Sheets

SELECTING DIVERSE PRODUCT TITLES TO DISPLAY ON A WEBSITE

CROSS REFERENCE TO RELATED APPLICATIONS

This application claims priority to U.S. Provisional Patent Application No. 61/493,877, filed on Jun. 6, 2011, entitled SELECTING DIVERSE PRODUCT TITLES GIVEN SPACE CONSTRAINT AT RUNTIME, which is hereby incorporated by reference in its entirety.

TECHNICAL FIELD

This application relates generally to information retrieval, and specifically, to a system and method for selecting diverse product titles given space constraints at runtime.

BACKGROUND

General merchandising of items for sale via a network-based merchandising system is well-known. Many websites accessible via the Internet are operated as online stores or auctions. These websites enable users to purchase items that may be physical items (e.g., an article of clothing), electronic data items (e.g., a downloadable digital media product), or services to be rendered by an affiliated service provider. To facilitate potential transactions and thereby improve user experiences, some websites provide recommendations of items to users.

BRIEF DESCRIPTION OF THE DRAWINGS

The present technology is illustrated by way of example, and not by way of limitation, in the figures of the accompanying drawings.

DETAILED DESCRIPTION

Overview

Methods and systems to select diverse product titles to display on a website are disclosed. In some example embodiments, the methods and systems described herein identify available products to be displayed, cluster the identified products based on their similarity to one another, randomly select one or more products from each of the clusters, and display information, such as a title, associated with the randomly selected products.

For example, an online auction website may receive a search request for a digital camera, and identify hundreds of cameras that satisfy the request, many of the identified cameras having titles that are similar to one another. Due to display space constraints, limitations on a presentation area in which to display product descriptions, and/or other constraints, the website may not be able to simultaneously present all of the hundreds of cameras in response to the request. Utilizing the methods and systems described herein, the auction website may assign each of the identified individual cameras to a cluster based on a similarity of their titles to one another, and then select, in some example embodiments randomly, one of the cameras from each of the clusters to display via the website. Thus, in some example embodiments, the systems and methods described herein enable an online auction website or other online retail store to display descriptions for a wide assortment of available products in a given category, as well as provide a fair opportunity for descriptions about some or every relevant available product to be displayed, among other benefits.

Suitable System

In the following description, for purposes of explanation, numerous specific details are set forth in order to provide a thorough understanding of the present disclosure. It may be evident, however, to one skilled in the art that the subject matter of the present disclosure may be practiced without these specific details.

Figure 1:
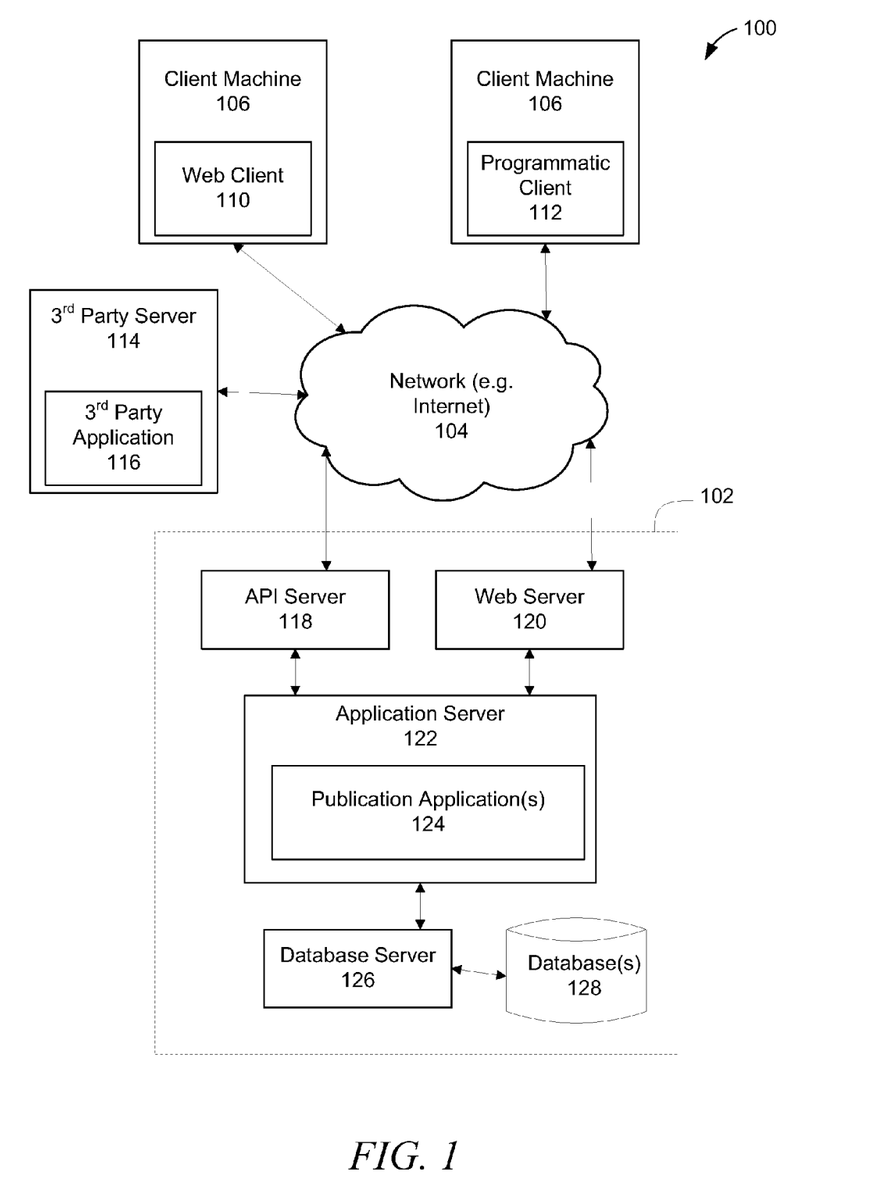
FIG. 1 is a block diagram illustrating a network architecture of a system used to select diverse product titles for display to a client device in some example embodiments.

FIG. 1 is a block diagram illustrating a network architecture of a system used to select diverse product titles for display to a client device in some example embodiments. For example, the network system 100 may be a publication/publisher system 102 where clients may communicate and exchange data within the network system 100. The data may pertain to various functions (e.g., selling and purchasing of items) and aspects (e.g., data describing items listed on the publication/publisher system) associated with the network system 100 and its users. Although illustrated herein as a client-server architecture as an example, other example embodiments may include other network architectures, such as a peer-to-peer or distributed network environment.

A data exchange platform, in an example form of a network-based publisher 102, may provide server-side functionality, via a network 104 (e.g., the Internet) to one or more clients. The one or more clients may include users that utilize the network system 100 and more specifically, the network-based publisher 102, to exchange data over the network 114. These transactions may include transmitting, receiving (communicating) and processing data to, from, and regarding content and users of the network system 100. The data may include, but are not limited to, content and user data such as feedback data; user reputation values; user profiles; user attributes; product and service reviews; product, service, manufacture, and vendor recommendations and identifiers; product and service listings associated with buyers and sellers; auction bids; and transaction data, among other things.

In various embodiments, the data exchanges within the network system 100 may be dependent upon user-selected functions available through one or more client or user interfaces (UIs). The UIs may be associated with a client machine, such as a client machine 106 using a web client 110. The web client 110 may be in communication with the network-based publisher 102 via a web server 120. The UIs may also be associated with a client machine 108 using a programmatic client 112, such as a client application, or a third party server 114 hosting a third party application 116. It can be appreciated in various embodiments the client machine 106, 108, or third party application 114 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things.

Turning to the network-based publisher 102, an application program interface (API) server 118 and a web server 120 are coupled to, and provide programmatic and web interfaces respectively to, one or more application servers 122. The application servers 122 host one or more publication application (s) 124. The application servers 122 are, in turn, shown to be coupled to one or more database server(s) 126 that facilitate access to one or more database(s) 128.

In some example embodiments, the web server 120 and the API server 118 communicate and receive data pertaining to listings, transactions, and feedback, among other things, via various user input tools. For example, the web server 120 may send and receive data to and from a toolbar or webpage on a browser application (e.g., web client 110) operating on a client machine (e.g., client machine 106). The API server 118 may send and receive data to and from an application (e.g., client application 112 or third party application 116) running on another client machine (e.g., client machine 108 or third party server 114).

The publication application(s) 124 may provide a number of publisher functions and services (e.g., search, listing, payment, etc.) to users that access the network-based publisher 102. For example, the publication application(s) 124 may provide a number of services and functions to users for listing goods and/or services for sale, searching for goods and services, facilitating transactions, and reviewing and providing feedback about transactions and associated users. Additionally, the publication application(s) 124 may track and store data and metadata relating to listings, transactions, and user interactions with the network-based publisher 102.

FIG. 1 also illustrates a third party application 116 that may execute on a third party server 114 and may have programmatic access to the network-based publisher 102 via the programmatic interface provided by the API server 118. For example, the third party application 116 may use information retrieved from the network-based publisher 102 to support one or more features or functions on a website hosted by the third party. The third party website may, for example, provide one or more listing, feedback, publisher or payment functions that are supported by the relevant applications of the network-based publisher 102.

While the example network architecture 100 of FIG. 1 employs a client-server architecture, a skilled artisan will recognize that the present disclosure is not limited to such an architecture. The example network architecture 100 can equally well find application in, for example, a distributed or peer-to-peer architecture system.

Figure 2:
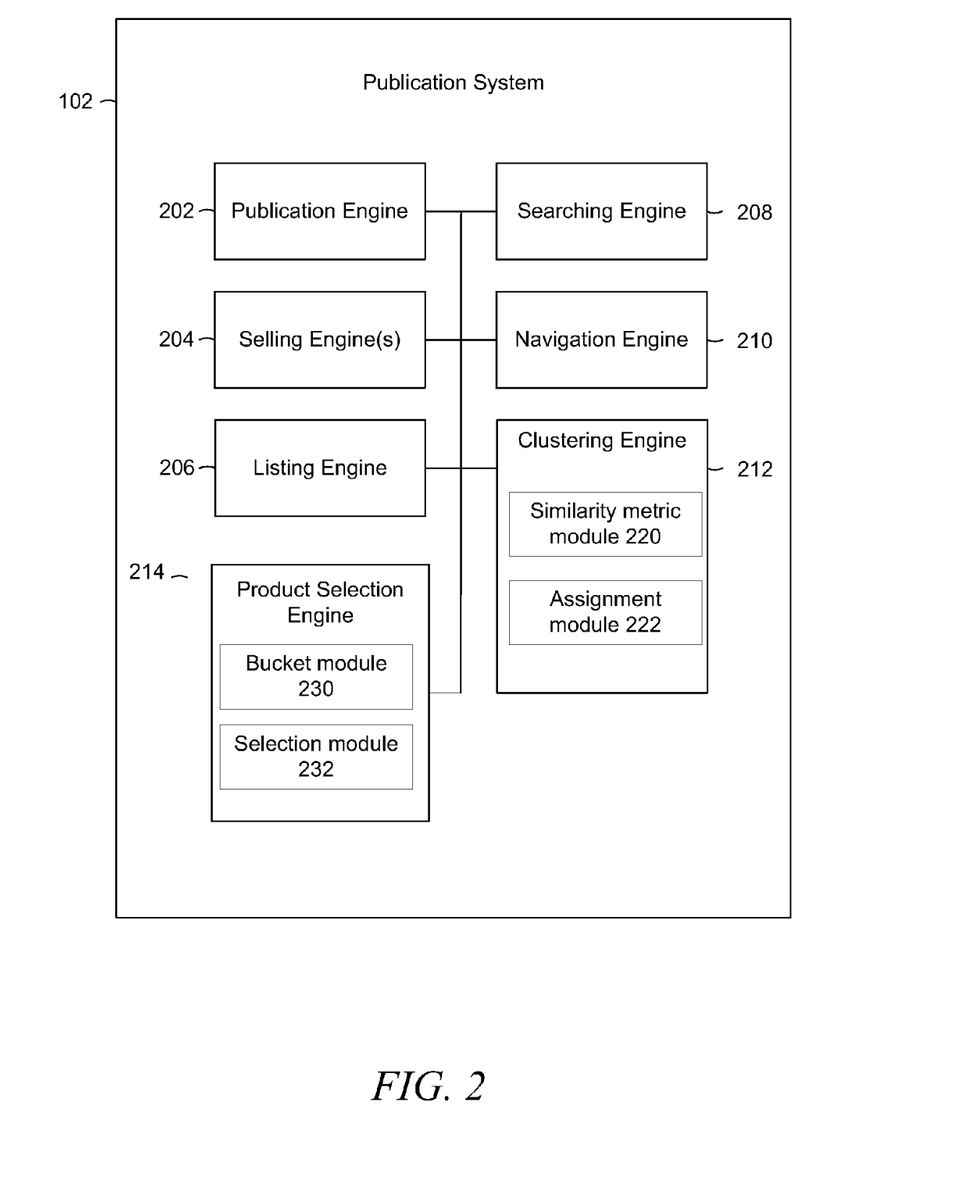
FIG. 2 is a block diagram illustrating a publication system of available products in some example embodiments.

Referring now to FIG. 2, an example block diagram illustrating multiple components that, in some example embodiments, are provided within the publication system 102 of the networked system 100 is shown. The publication system 102 may be hosted on dedicated or shared server machines (not shown) that are communicatively coupled to enable communications between the server machines. The multiple components, themselves, are communicatively coupled (e.g., via appropriate interfaces), either directly or indirectly, to each other and to various data sources, to allow information to be passed between the components or to allow the components to share and access common data. Furthermore, the components may access the one or more database(s) 128 via the one or more database servers 126, both shown in FIG. 1.

In some example embodiments, the publication system 102 comprises a network-based marketplace and provides a number of publishing, listing, and price-setting mechanisms whereby a seller (e.g., business or consumer) may list (or publish information concerning) goods or services for sale, a buyer can search for, express interest in, or indicate a desire to purchase such goods or services, and a price can be set for a transaction pertaining to the goods or services. To this end, the publication system 102 may comprise at least one publication engine 202 and one or more selling engines 204. The publication engine 202 may publish information, such as item listings or product description pages, on the publication system 102. In some example embodiments, the selling engines 204 may comprise one or more auction engines that support auction-format listing and price setting mechanisms (e.g., English, Dutch, Chinese, Double, Reverse auctions, and so on). The various auction engines may also provide a number of features in support of these auction-format listings, such as a reserve price feature whereby a seller may specify a reserve price in connection with a listing and a proxy-bidding feature whereby a bidder may invoke automated proxy bidding.

A listing engine 206 allows sellers to conveniently author listings of items or authors to author publications. In some example embodiments, the listings pertain to goods or services that a user (e.g., a seller) wishes to transact via the publication system 102. Each good or service is associated with a particular category. The listing engine 206 may receive listing data such as title, description, and aspect name/value pairs. Furthermore, each listing for a good or service may be assigned an item identifier. In some example embodiments, a user may create a listing that is an advertisement or other form of information publication. The listing information may then be stored to one or more storage devices coupled to the publication system 102 (e.g., databases 128). Listings also may comprise product description pages that display a product and information (e.g., product title, specifications, reviews, and so on) associated with the product. In some example embodiments, the product description page may include an aggregation of item listings that correspond to the product described on the product description page.

Searching the network-based publication system 102 is facilitated by a searching engine 208. For example, the searching engine 208 enables keyword queries of listings published via the publication system 102. In some example embodiments, the searching engine 208 receives the keyword queries from a computing device associated with a user and conducts a review of the storage device storing the listing information. The review will enable compilation of a result set of listings that may be sorted and returned to the client device (e.g., client device 106) of the user. The searching engine 308 may record the query (e.g., keywords) and any subsequent user actions and behaviors (e.g., navigations).

In a further example, a navigation engine 210 allows users to navigate through various categories, catalogs, or inventory data structures according to which listings may be classified within the publication system 102. For example, the navigation engine 210 allows a user to successively navigate down a category tree comprising a hierarchy of categories (e.g., the category tree structure 100) until a particular set of listing is reached. Various other navigation applications within the navigation engine 210 may be provided to supplement the searching and browsing applications. The navigation engine 210 may record the various user actions (e.g., clicks) performed by the user in order to navigate down the category tree.

In some example embodiments, a clustering engine 212 examines product descriptions and clusters the product descriptions based on their similarity to one another. The clustering engine 212 may examine the titles of products (e.g., available products, products that satisfy a criterion, such as a search query, and so on) to determine the similarity between the various products described by the listings. In some example embodiments, the clustering engine 212 may calculate a cosine similarity score for a first product title compared to a second product title. Cosine similarity scores may be calculated for each set of two product titles until the relative similarities of all product titles have been compared. Product titles having a similarity score above and/or within a predetermined threshold may be clustered together, thereby resulting in one or more product clusters of similar product descriptions. Example operations performed by the clustering engine 212 are discussed in further detail herein.

In some example embodiments, the clustering engine 212 may include one or more modules and/or components to perform one or more operations of the clustering engine 212. The modules may be hardware, software, or a combination of hardware and software. The modules may be executed by one or more processors. For example, the clustering engine 212 may have a similarity metric module 220, and an assignment module 222.

The similarity metric module 220 may parse and tokenize the title of the product such that each word in the title of the product becomes a separate token and generate a similarity metric or score between two product descriptions based on the performance of one or more similarity algorithms on the tokens. For example, the similarity metric module 220 may execute a cosine similarity algorithm on the product title tokens to determine a degree of similarity between two products.

The assignment module 222 may sort combinations (e.g., two or more product descriptions) by similarity scores or other metrics, group product descriptions within one or more clusters, and/or assign product listings to certain clusters, based on whether the similarity score of the product combination meets or exceeds a predetermined threshold.

In some example embodiments, a product selection engine 214 may select one or more product descriptions from one or more product clusters for presentation to a client device. In some example embodiments, a portion of a display environment (e.g., a portion of a user interface) on a client device may be designated for presenting descriptions of related or recommended products. The portion of the display environment may be limited based on the design of the web page or based on client device specifications (e.g., small display screen size on a mobile device). As a result, to present a diverse selection of products to a user via a client device, the product selection engine 214 may select, randomly or otherwise, one or more products from one or more product similarity clusters, depending on space constraints, for presentation. For example, if a user searches for "mp3 players," the user may not want to see five variations of the same product as "recommended" or "related" products. The clustering engine 212 may cluster the five variations of the same product as one product cluster, such that when the time to present related or recommended products arrives, the product selection engine 214 may select one or two of the five variations of the same product for presentation and one or more other products for presentation. Further details regarding operations performed by the product selection engine 214 are discussed in further detail herein.

In some example embodiments, the product selection engine 214 may include one or more modules and/or components to perform one or more operations of the product selection engine 214. The modules may be hardware, software, or a combination of hardware and software. The modules may be executed by one or more processors. For example, the product selection engine 214 may have a bucket module 230 and a selection module 232. The bucket module 230 may determine from how many clusters products should be selected for a particular product presentation. For example, product description display constraints may dictate the number of related or recommended products that may be displayed on a client device. The constraints may in turn influence the number of buckets from which products to be displayed are selected. For example, if four products may be displayed in a certain area of a display environment, the bucket module may organize product clusters into two buckets. Each bucket may include one or more product clusters. The selection module 232 may select products from each bucket for presentation. In some example embodiments, the selection may be performed using a technique that randomly selects one of the cameras from each of the clusters, in order to maintain eligibility of some or all of the available products for selection and display.

Although the various components of the publication system 102 have been discussed in terms of a variety of individual modules and engines, a skilled artisan will recognize that many of the components can be combined or organized in other ways. Furthermore, not all components of the publication system 102 have been included in FIG. 2. In general, components, protocols, structures, and techniques not directly related to functions of example embodiments (e.g., dispute resolution engine, loyalty promotion engine, reputation engines, listing management engines, account engine) have not been shown or discussed in detail. The description given herein simply provides a variety of example embodiments to aid the reader in an understanding of the systems and methods used herein.

Selecting Diverse Products to Display

Figure 3:
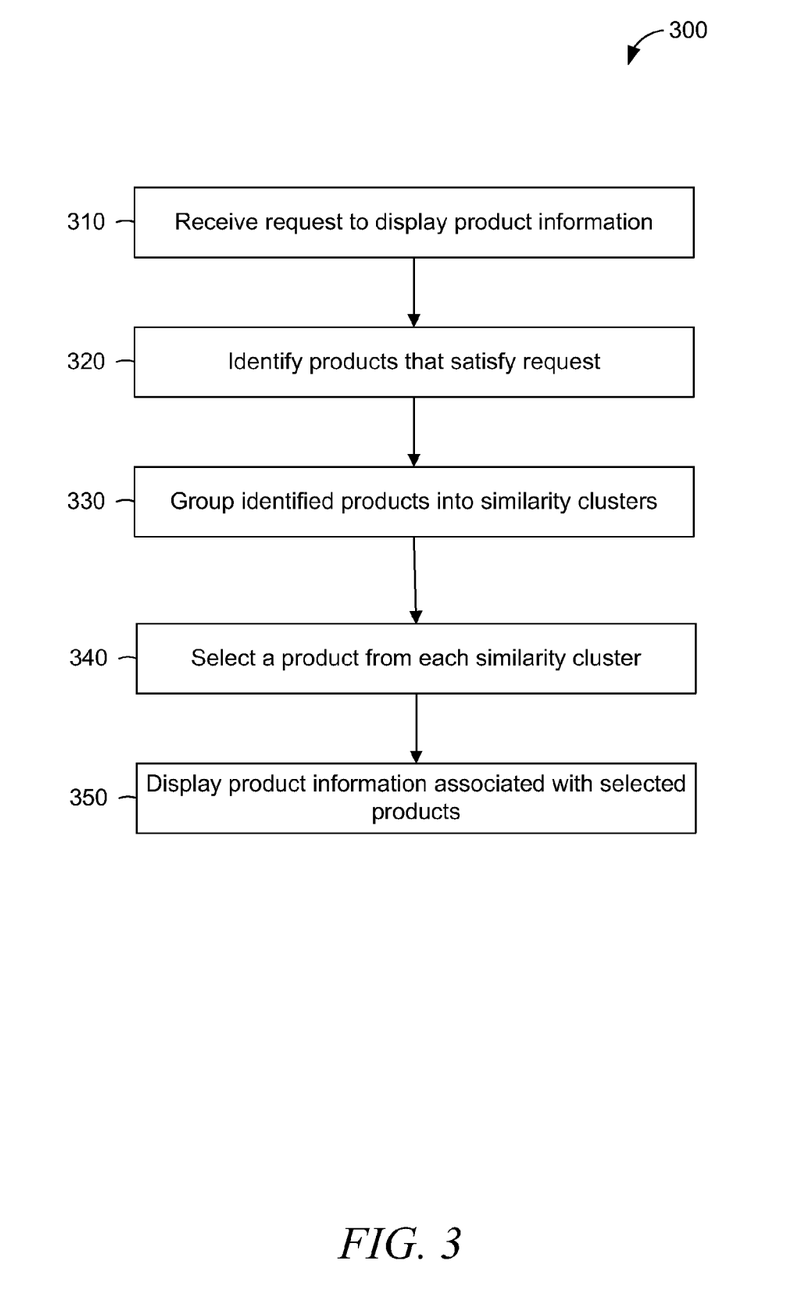
FIG. 3 is a flow diagram illustrating a method for displaying information associated with available products in some example embodiments.

As described herein, in some example embodiments, the system may display a diverse group of products based on generating similarity clusters of similar products and randomly selecting one or more products from each of the clusters for display. FIG. 3 is a flow diagram illustrating a method 300 for displaying information associated with available products in some example embodiments.

In step 310, the method receives a request to display product information. For example, the method, via the searching engine 208, receives a request to display information associated with available products that satisfy a search query or other request. The method, in some example embodiments, may consider various different received inputs as a request to display product information, including input associated with received search requests, input associated with requests for additional information, input associated with requests to filter presented information, input associated with resizing or otherwise adjusting a display of product information, input associated with a request to show specific products, input associated with a request to show alternative products, a launching or navigation to a website or webpage of a website, and so on.

In step 320, the method identifies product descriptions that satisfy the request. For example, the method, via the searching engine 208, returns results from a received search request, such as a group of available products that satisfy the request. The method, in some example embodiments, may determine that a product or products satisfy a request when a title or other information describing the product includes words and/or phrases that satisfy the request, and return a group of all available products in response to the request.

In step 330, the method groups the identified products into similarity clusters. For example, the method, via the clustering engine 212, assigns each of the identified products to a cluster of products based on the similarity of their descriptions to one another. In clustering or otherwise grouping products with one another, the method, in some example embodiments, may utilize a variety of different clustering techniques, such as techniques described with respect to FIG. 4.

Figure 4:
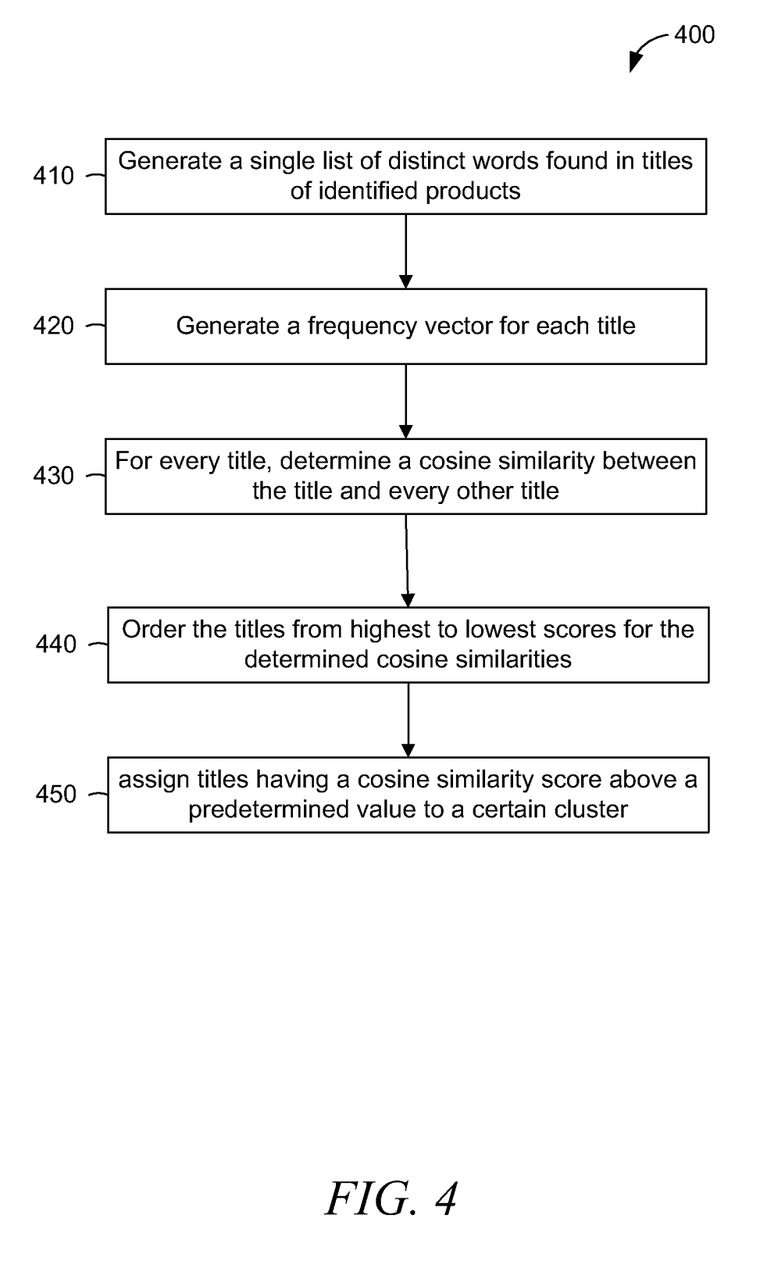
FIG. 4 is a flow diagram illustrating a method for generating clusters of similar products in some example embodiments.

FIG. 4 is a flow diagram illustrating a method 400 for generating clusters of similar products in some example embodiments. In step 410, the method generates a single list of distinct words found in titles of available, or identified, products. In step 420, the method generates a frequency vector for each title associated with the available products. In step 430, for every title, the method determines a cosine similarity between the title and every other title.

The following is an example calculation of a cosine similarity between two products, or, between the titles of two products, "IPOD NANO black 16 gb" (title 1), and "IPOD NANO 8 gb silver iPod" (title 2). Following the method 400, a frequency vector for each of the titles is determined:

| Word | IPOD | NANO | black | 16 gb | 8 gb | silver |
|---|---|---|---|---|---|---|
| Title 1 | 1 | 1 | 1 | 1 | 0 | 0 |
| Title 2 | 2 | 1 | 0 | 0 | 1 | 1 |

The method 400 may then calculate the cosine similarity using the two frequency vectors, as cosine similarity=(vector dot product of vector 1 and vector 2)/(square root of dot product of vector 1 and itself)*(square root of dot product of vector 2 and itself)=0.56.

After determining the cosine similarities, the method 400, in step 440, orders the titles from highest to lowest scores for the determined cosine similarities. In step 450, the method assigns titles having cosine similarity scores above a predetermined threshold value to a certain cluster. In some examples, the method may utilize a single link hierarchical clustering algorithm, or other similar clustering algorithm, when assigning titles to clusters. In some example embodiments, the method may utilize a predetermined value for the threshold value, such as 0.60, 0.65, 0.70, and so on. In some example embodiments, the method may dynamically determine a threshold value based on a variety of factors, such as a number of available products, a number of products to be displayed, and so on.

Thus, in some example embodiments, the method of FIG. 4, given an input of n <titles>, outputs a list of n<titles>, each having an assigned cluster ID. Turning back to FIG. 3, the method 300, in step 340, selects a product from each similarity cluster. For example, the method, via the product selection engine 214, may perform a variety of different selection techniques to select a product from each cluster. In some example embodiments, the method may randomly select one or more products from each of the similarity clusters.

Figure 5:
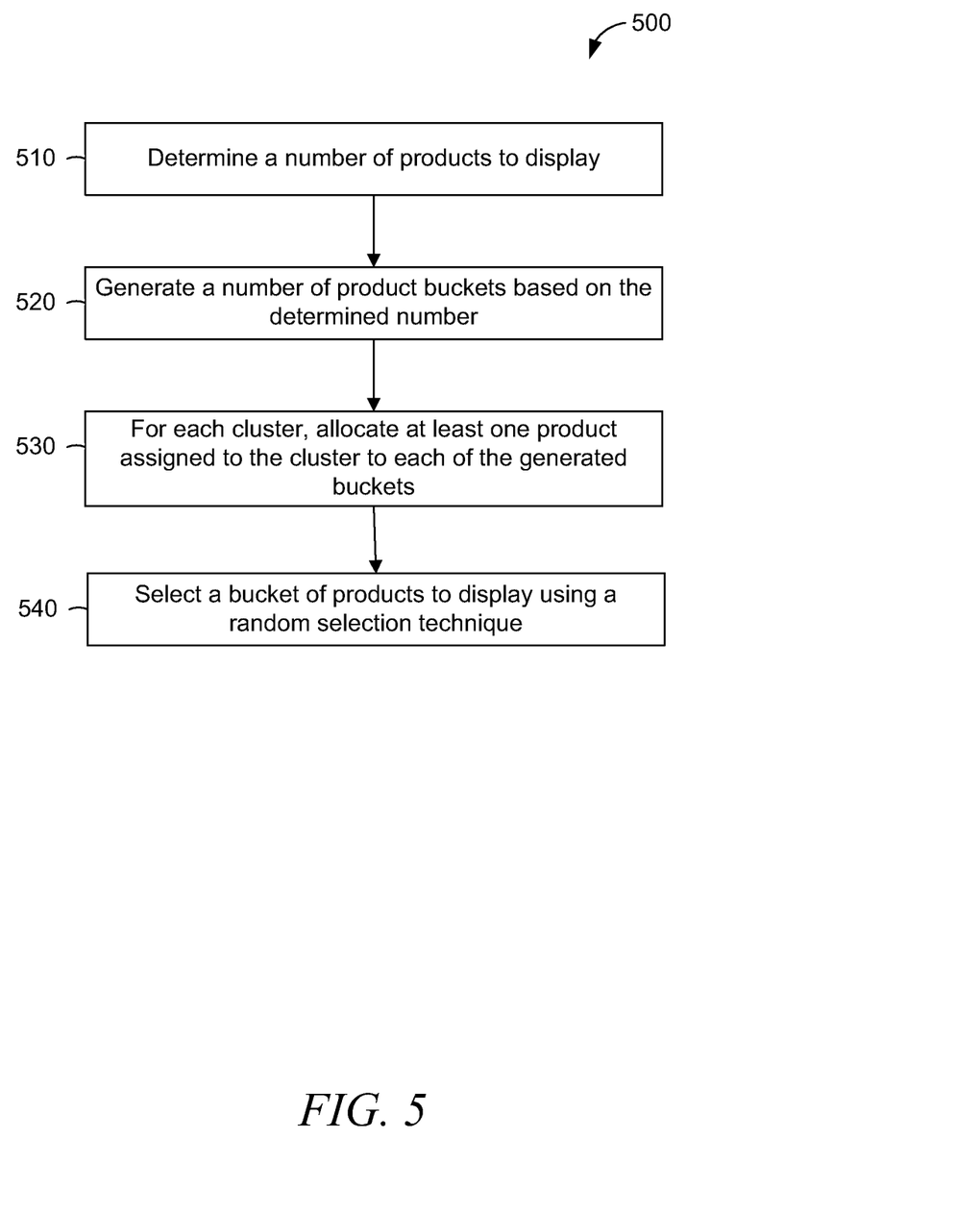
FIG. 5 is a flow diagram illustrating a method for selecting available products for display in some example embodiments.

In some example embodiments, the method, in step 340, may generate and disperse and/or allot the products assigned to the clusters to one or more buckets to be displayed. FIG. 5 is a flow diagram illustrating a method 500 for selecting available products for display in some example embodiments.

In step 510, the method determines a number of products to display. In some example embodiments, the method may utilize a predetermined number of products to display, such as four products, five products, and so on. In some example embodiments, the method may dynamically determine a number of products to display, such as a number based on an available display area, based on a number of available products, and so on.

In step 520, the method generates a number of product buckets based on the determined number of products to display. For example, the method may receive information indicating there are 40 available products to be displayed, and the four of the products are to be displayed, and may generate 10 product buckets based on the information.

In step 530, the method, for each cluster, distributes, allocates and/or assigns at least one product assigned to the cluster to each of the generated product buckets. In other words, the method distributes a product from each cluster to a distinguished bucket of the generated buckets. For example, suppose three clusters (A, B, and C), each having four assigned products (A1-A4, B1-B4, C1-C4) are to be dispersed to two buckets (1 and 2). Following step 530, the method disperses the products as shown in the following table:

| Bucket 1 | Bucket 2 |
|---|---|
| A1 | A2 |
| A3 | A4 |
| B1 | B2 |
| B3 | B4 |
| C1 | C2 |
| C3 | C4 |

Thus, when the products of all clusters A-C have been dispersed into buckets, Bucket 1 includes products A1, A3, B1, B3, C1, and C3, and Bucket 2 includes A2, A4, B2, B4, C2, and C4.

In step 540, the method selects a bucket of products to display using a random selection technique. For example, the method may utilize a random number generator to select one of the buckets, Bucket 1 or Bucket 2, in order to display the products associated with a selected bucket.

Thus, in some example embodiments, the method 300, via step 340, utilizes various algorithms to randomly select one or more products from each of the similarity clusters of products.

The following example illustrates a selection algorithm that may be utilized in some example embodiments. The selection algorithm, or logic, may facilitate a fair chance to all available products that may be displayed while maintaining diversity in the types of products that are displayed, among other benefits. Given an input of 37 available products (n=37), with 5 products to be displayed (m=5), the method may create k buckets, where k=n/m, and k=k+1 when n % m>0, giving k=8. With A being equal to an array of k flags to store to the bucket of a currently dispersed product, you can initialize A to zeros. For each group in 0 to L, the following algorithm may be run:

```
☐ Do
☐ For each product p in group
    i. Do
        1. int assigned = 0;
            a. While (assigned == 0)
                i. Generate random number from 1 to k
                ii. If A[k] != 1 then assign p to kth bucket and set
                    A[k] = 1; assigned = 1;
            b. If all the flags in A[k] are 1, then the reset all the flags
               to 0. (this means we have assigned at least one product
               to each bucket randomly)
    ii. Done
☐ Done
☐ Generate random number from 1 to k and select kth bucket.
```

Figure 6:
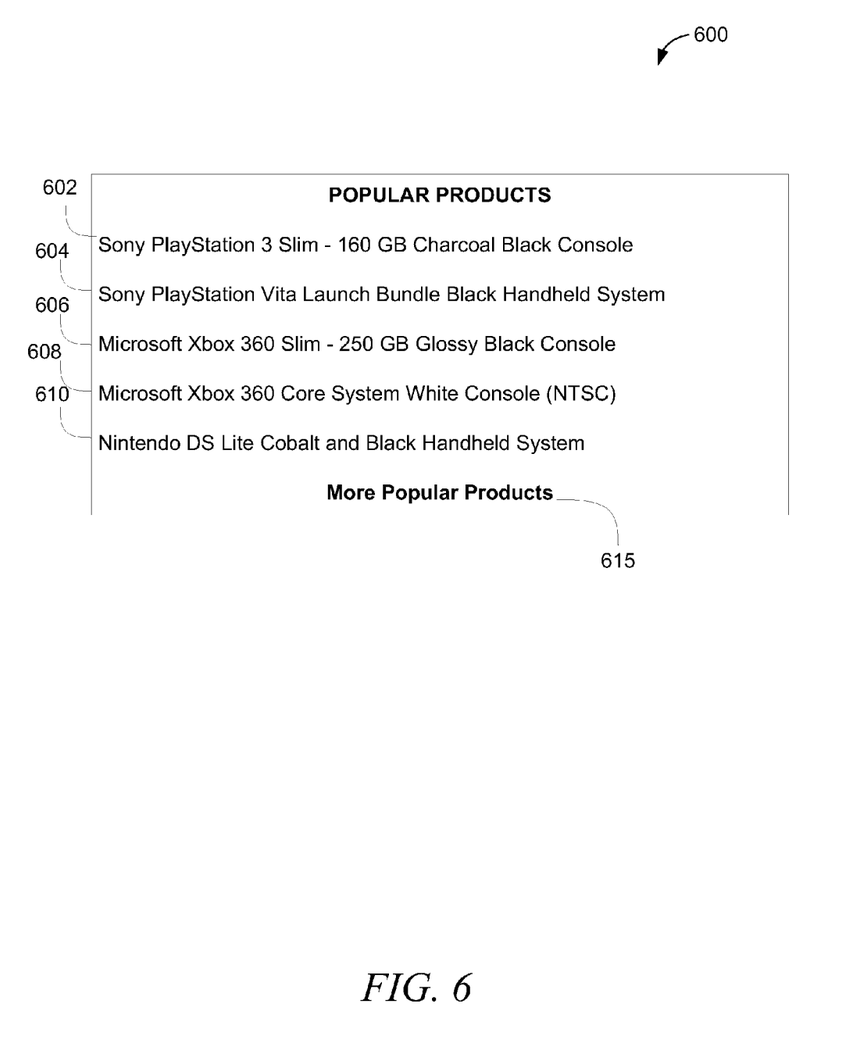
FIG. 6 is a display diagram illustrating displayed information associated with selected available products in some example embodiments.

Turning back to FIG. 3, the method 300, in step 350, displays product information associated with the selected products. For example, the method, via the listing engine 206, may display information, such as titles, descriptions, and so on, associated with products selected in step 340 or via method 500, among other techniques. FIG. 6 is a display diagram 600 illustrating displayed information associated with selected available products in some example embodiments.

The display diagram 600 depicts an example display of information 602-610 as a "Popular Products" sidebar of a webpage that displays products available in auctions or otherwise for purchase via the webpage. The display diagram 600 utilizes the systems and methods described herein to present information from a variety of different products that are associated with a search for "video game consoles" received via a search component of the webpage. For example, the display diagram 600 presents two different titles 602, 604 for a SONY PLAYSTATION, two different titles 606, 608 for a MICROSOFT XBOX, and a title 610 for a NINTENDO DS, among other things. The display diagram 600 may also display information 615 associated with displaying other products, such as a selectable phrase to find "other popular products." In some example embodiments, selection of the phrase 615 may trigger some or all of the method described herein, causing the display 600 to present an updated, randomly generated list of diverse titles, among other things.

Thus, in some example embodiments, the systems and methods descried herein enable presentation of a limited, yet diverse, set of titles associated with many products that satisfy a search query, such as a query for "video game consoles."

Of course, a skilled artisan will appreciate that information may be displayed in a variety of different locations on a webpage, such as a webpage for an auction site, an online retailer, and so on, such as a main listings section, a sidebar displaying recommended or preferred products, among other things.

CONCLUSION

Figure 7:
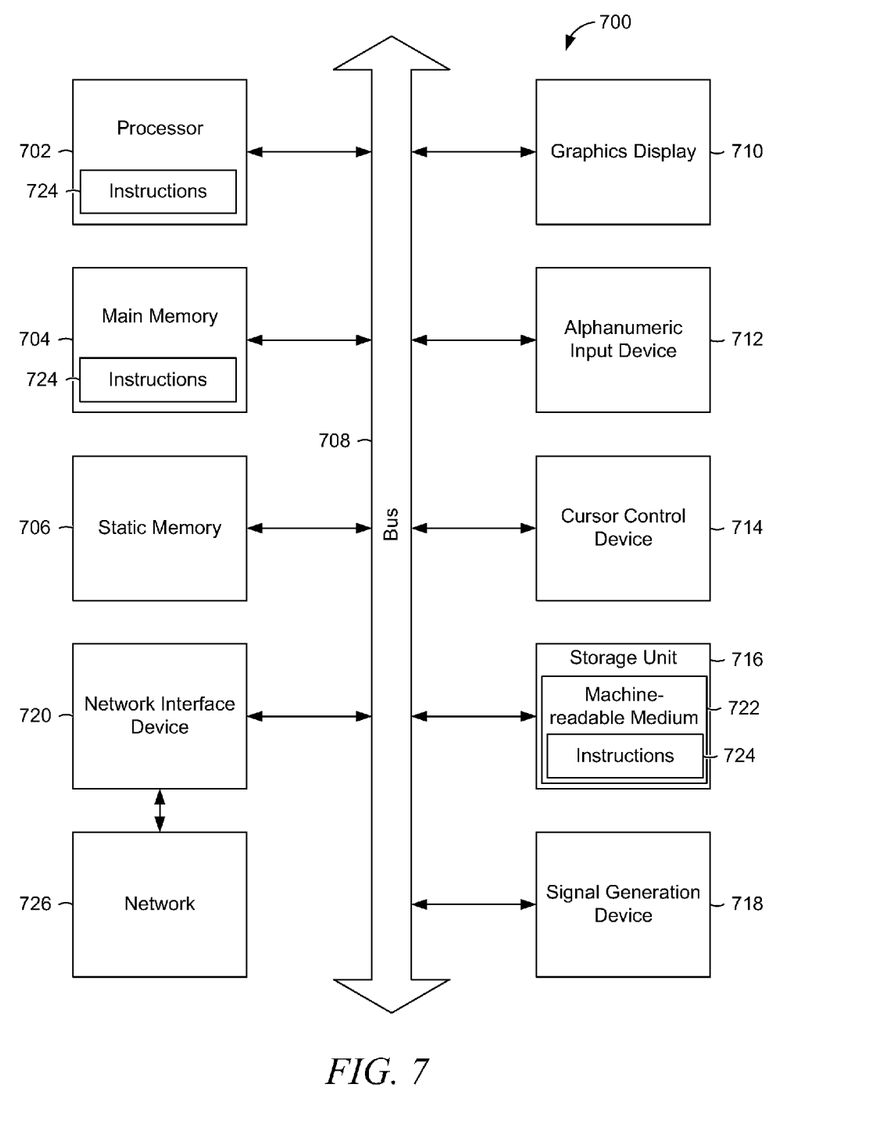
FIG. 7 shows a diagrammatic representation of a machine in the example form of a computer system within which a set of instructions may be executed to cause the machine to perform any one or more of the methodologies discussed herein.

FIG. 7 shows a diagrammatic representation of machine in the exemplary form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU) a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media. The software 724 may further be transmitted or received over a network 726 via the network interface device 720.

While the machine-readable medium 722 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

Certain embodiments are described herein as including logic or a number of components, modules, or mechanisms. Modules may constitute either software modules (e.g., code embodied on a machine-readable medium or in a transmission signal) or hardware modules.

A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

Thus, a method and system to select diverse product titles given space constraints at runtime has been described. Although the present disclosure has been described with reference to specific exemplary embodiments, it may be evident that various modifications and changes may be made to these embodiments without departing from the broader spirit and scope of the disclosure. Accordingly, the specification and drawings are to be regarded in an illustrative rather than a restrictive sense.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

What is claimed is:

1. A system, comprising:
  one or more processors and executable instructions accessible on a computer-readable medium that, in response to being executed, cause the system to perform operations comprising:
    receiving, by a server over a network, a keyword query from a client machine, the keyword query including a display constraint of a display of the client machine;
    accessing a network database storing publication information;
    in response to receiving the keyword query, generating a publication set;
    grouping the publication set into a particular cluster of multiple clusters based on a similarity metric between each of the publications of the publication set and other publications, each cluster comprising a cluster of similar publications and each of the multiple clusters being associated with a different similarity metric value;
    determining similarity metrics between the publications;
    assigning the publications to one of the multiple clusters based on the determined similarity metrics satisfying a threshold value of clustering publications;

distributing, at random, each publication of the multiple clusters to one of multiple distinguished buckets of publications, a quantity of the multiple distinguished buckets being based on the display constraint of the display;

selecting, at random, one of the multiple distinguished buckets of publications; and transmitting, from a server over a network, instructions to cause the display of the client machine to generate a user interface that is configured to display descriptions for the publications of the randomly selected distinguished bucket in response to the received keyword query.

2. The system of claim 1, wherein the operations further comprise:

grouping the publication set based on a similarity metric between a title of a publication and titles of other publications; and transmitting, from a server over a network, instructions to cause the client machine to generate a user interface that is configured to display titles associated with the randomly selected publications.

3. The system of claim 1, wherein the operations further comprise:

grouping the publication set based on a similarity metric between a title of a publication and titles of other publications; and transmitting, from a server over a network, instructions to cause the client machine to generate a user interface that is configured to display non title information associated with the randomly selected publications.

4. The system of claim 1, wherein the operations further comprise transmitting, from a server over a network, instructions to cause the display of the client machine to generate a user interface that is configured to display titles associated with the publications of the randomly distinguished bucket along a sidebar presented by a web page associated with an online retail environment.

5. The system of claim 1, wherein the operations further comprise assigning a value for the similarity metric based on a number publications.

6. A computerized method, comprising:

receiving, by a server over a network, a keyword query from a client machine, the keyword query including a display constraint of a display of the client machine;

accessing a network database storing publication information;

in response to receiving the keyword query, generating a publication set;

grouping the publication set into a particular cluster of multiple clusters based on a similarity metric between each of the publications of the publication set and other publications, each cluster comprising a cluster of similar publications and each of the multiple clusters being associated with a different similarity metric value;

determining similarity metrics between the publications and assigning the publications to one of the multiple clusters based on the determined similarity metrics satisfying a threshold value of clustering publications;

distributing, at random, each publication of the multiple clusters to one of multiple distinguished buckets of publications, a quantity of the multiple distinguished buckets being based on the display constraint of the display;

selecting, at random, one of the multiple distinguished buckets of publications; and transmitting, from a server over a network, instructions to cause the display of the client machine to generate a user interface that is configured to display descriptions for the publications of the randomly selected distinguished bucket in response to the received keyword query.

7. The computerized method of claim 6, further comprising:

comparing a title of the publication to titles of other publications within the publication set; and determining a similarity metric including calculating a cosine similarity score for each of the titles.

8. The computerized method of claim 6, further comprising: receiving a runtime request to display publication descriptions associated with one or more publications available for selection on the website.

9. The computerized method of claim 6, further comprising transmitting, from a server over a network, instructions to cause a client machine to generate a modified user interface that is configured to display, in a modified size format, publications available for selection on the website.

10. A non-transitory machine-readable storage medium having embodied thereon instructions, that in response to being executed by one or more processors of a machine, cause the machine to perform operations comprising:

receiving, by a server over a network, a keyword query from a client machine, the keyword query including a display constraint of a display of the client machine;

accessing a network based publication a network database storing publication information;

in response to receiving the keyword query, generating a publication set;

grouping the publication set into a particular cluster of multiple clusters based on a similarity metric between each of the publications of the publication set and other publications, each cluster comprising a cluster of similar publications and each of the multiple clusters being associated with a different similarity metric value;

determining similarity metrics between the publications and assigning the publications to one of the multiple clusters based on the determined similarity metrics satisfying a threshold value of clustering publications;

distributing, at random, each publication of the multiple clusters to one of multiple distinguished buckets of publications, a quantity of the multiple distinguished buckets being based on the display constraint of the display;

selecting, at random, one of the multiple distinguished buckets of publications; and transmitting, from a server over a network, instructions to cause the display of the client machine to generate a user interface that is configured to display descriptions for the publications of the randomly selected distinguished bucket in response to the received keyword query.

11. The computer-readable storage medium of claim 10, wherein the operations further comprise transmitting, from a server over a network, instructions to cause the display of the client machine to generate a user interface that is configured to display titles for the publications within the randomly selected grouping.

12. The computer-readable storage medium of claim 10, wherein the operations further comprise transmitting, from a server over a network, instructions to cause the display of the client machine to generate a user interface that is configured to display an indication of other publications similar to the publications within the randomly selected grouping.

13. The computer-readable storage medium of claim 10, wherein receiving a keyword query includes receiving a request from a user via a web page presenting descriptions for some of the publications to present descriptions for other publications.

14. The computer-readable storage medium of claim 10, wherein the operations further comprise:
  receiving an indication that a size of a display of the descriptions for the publications within the randomly selected grouping has changed;
  receiving modified information associated with a modified number of publications to display based on the received indication that the size of the display of the descriptions for the publications within the randomly selected grouping has changed;
  forming modified groupings of publications based on the number of publications that satisfy the criterion and based on the modified number of publications to display, wherein each grouping includes one publication from the particular cluster;
  randomly selecting a formed modified grouping; and
  transmitting, from a server over a network, instructions to cause the display of the client machine to generate a user interface that is configured to display publication descriptions for the publications within the randomly selected modified grouping.

15. The system of claim 1, wherein the display constraint includes a display area.

16. The computerized method of claim 6, wherein the display constraint includes a display area.

17. The computer-readable storage medium of claim 10, wherein the display constraint includes a display area.

\* \* \* \* \*